(12) United States Patent
Washizu

(10) Patent No.: US 10,759,885 B2
(45) Date of Patent: *Sep. 1, 2020

(54) HYDROGENATED BRANCHED CONJUGATED DIENE COPOLYMER, RUBBER COMPOSITION AND PNEUMATIC TIRE

(71) Applicant: SUMITOMO RUBBER INDUSTRIES, LTD., Kobe-shi (JP)

(72) Inventor: Kensuke Washizu, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 56 days.

This patent is subject to a terminal disclaimer.

(21) Appl. No.: 15/983,715

(22) Filed: May 18, 2018

(65) Prior Publication Data

US 2018/0265610 A1 Sep. 20, 2018

Related U.S. Application Data

(63) Continuation of application No. 14/378,193, filed as application No. PCT/JP2013/051189 on Jan. 22, 2013, now Pat. No. 10,040,877.

(30) Foreign Application Priority Data

Mar. 6, 2012 (JP) ................................ 2012-049687
Oct. 4, 2012 (JP) ................................ 2012-222395

(51) Int. Cl.
| | |
|---|---|
| *C08F 36/22* | (2006.01) |
| *C08F 236/10* | (2006.01) |
| *C08F 236/22* | (2006.01) |
| *C08L 47/00* | (2006.01) |
| *C08C 19/02* | (2006.01) |
| *B60C 1/00* | (2006.01) |
| *C08F 36/06* | (2006.01) |
| *C08F 36/08* | (2006.01) |

(52) U.S. Cl.
CPC ............ *C08F 36/22* (2013.01); *B60C 1/0016* (2013.01); *C08C 19/02* (2013.01); *C08F 36/06* (2013.01); *C08F 36/08* (2013.01); *C08F 236/10* (2013.01); *C08F 236/22* (2013.01); *C08L 47/00* (2013.01)

(58) Field of Classification Search
CPC ............................... C08F 36/22; C08F 236/22
See application file for complete search history.

(56) References Cited

U.S. PATENT DOCUMENTS

| | | | |
|---|---|---|---|
| 4,374,957 A | 2/1983 | Quirk | |
| 5,210,359 A | 5/1993 | Coolbaugh et al. | |
| 5,232,987 A | 8/1993 | Sakakibara et al. | |
| 5,364,723 A | 11/1994 | Georges et al. | |
| 7,595,365 B2 | 9/2009 | Kappes et al. | |
| 8,912,301 B2 | 12/2014 | Washizu | |
| 8,940,848 B2 | 1/2015 | Washizu | |
| 2004/0048962 A1 | 3/2004 | Kojima et al. | |
| 2006/0004131 A1 | 1/2006 | Ozawa et al. | |
| 2006/0167160 A1 | 7/2006 | Nakagawa et al. | |
| 2007/0123636 A1 | 5/2007 | Hattori et al. | |
| 2010/0056714 A1 | 3/2010 | McPhee | |
| 2010/0056743 A1 | 3/2010 | McPhee | |
| 2010/0224301 A1 | 9/2010 | Sakamoto et al. | |
| 2011/0301280 A1 | 12/2011 | Kushida | |
| 2013/0011667 A1 | 1/2013 | Mase et al. | |
| 2014/0100316 A1 | 4/2014 | Washizu | |
| 2014/0200321 A1 | 7/2014 | Washizu | |

FOREIGN PATENT DOCUMENTS

| | | |
|---|---|---|
| GB | 611157 | 10/1948 |
| JP | 63-101440 | 5/1988 |
| JP | 63-179908 | 7/1988 |
| JP | 04-370131 A | 12/1992 |
| JP | 04370131 A | 12/1992 |
| JP | 05-025313 A | 2/1993 |
| JP | 05-125108 | 5/1993 |
| JP | 05-125225 | 5/1993 |
| JP | 06-313016 | 11/1994 |

(Continued)

OTHER PUBLICATIONS

International Search Report dated Mar. 26, 2013, in PCT/JP13/051189, filed Jan. 22, 2013.

(Continued)

*Primary Examiner* — Brieann R Johnston
(74) *Attorney, Agent, or Firm* — Oblon, McClelland, Maier & Neustadt, L.L.P.

(57) ABSTRACT

A pneumatic tire produced by processing a rubber composition including a hydrogenated branched conjugated diene copolymer produced by copolymerizing a branched conjugated diene compound and a vinyl compound to form a branched conjugated diene copolymer and hydrogenating the branched conjugated diene copolymer. The branched conjugated diene compound is represented by formula (1),

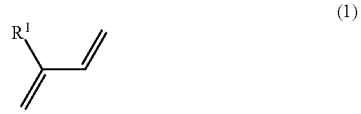

(1)

where $R^1$ is an aliphatic hydrocarbon having 6 to 11 carbon atoms, the vinyl compound is represented by formula (3),

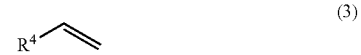

(3)

where $R^4$ is a hydrogen atom, an aliphatic hydrocarbon group having 1 to 3 carbon atoms, an alicyclic hydrocarbon group having 3 to 8 carbon atoms, or an aromatic hydrocarbon group having 6 to 10 carbon atoms.

21 Claims, No Drawings

(56) References Cited

FOREIGN PATENT DOCUMENTS

| JP | 2008-156516 | | 7/2008 |
|---|---|---|---|
| JP | 2009-138025 | A | 6/2009 |
| JP | 2010-215880 | A | 9/2010 |
| JP | 2010-242019 | A | 10/2010 |
| WO | WO 2010/027463 | A1 | 3/2010 |
| WO | WO 2010/027464 | | 3/2010 |
| WO | WO 2011/115140 | A1 | 9/2011 |
| WO | WO 2013/047347 | A1 | 4/2013 |
| WO | WO 2013/115011 | A1 | 8/2013 |
| WO | WO 20131115010 | A1 | 8/2013 |

OTHER PUBLICATIONS

Johanson (Emulsion Polymerization of Myrcene. Industrial and Engineering Chemistry. Mar. 1948, 3 pages).
Code of Federal Regulations (The National Archives of the United States, 1949 Edition, 8 pages).
Machine translated English equivalent of JP 05-125225 (16 pages, May 1993).
Extended European Search report dated Nov. 12, 2015, in European Patent Application No. 13758252.4 (6 pages).
Office Action dated May 10, 2016 in Japanese Patent Application No. 2014-503710.

10,759,885 B2

HYDROGENATED BRANCHED CONJUGATED DIENE COPOLYMER, RUBBER COMPOSITION AND PNEUMATIC TIRE

CROSS-REFERENCE TO RELATED APPLICATIONS

The present application is a continuation of U.S. application Ser. No. 14/378,193, filed Aug. 12, 2014, the entire contents of which are incorporated herein by reference. U.S. application Ser. No. 14/378,193 is a National Stage of International Application No. PCT/JP2013/51189, filed Jan. 22, 2013, which is based upon and claims the benefit of priority to Japanese Applications No. 2012-222395, filed Oct. 4, 2012 and No. 2012-049687, filed Mar. 6, 2012. The present application claims the benefit of priority to Japanese Applications No. 2012-222395 and No. 2012-049687, U.S. application Ser. No. 14/378,193 and International Application No. PCT/JP2013/51189.

TECHNICAL FIELD

The present invention relates to a hydrogenated branched conjugated diene copolymer, a rubber composition comprising the copolymer, and a pneumatic tire produced using the rubber composition. Further, the present invention relates to a branched conjugated diene copolymer, a rubber composition comprising the copolymer, and a pneumatic tire produced using the rubber composition.

BACKGROUND ART

For treads for high performance tires, generally high level grip performance and abrasion resistance are demanded. So far, in order to obtain a rubber composition exhibiting high grip performance, there have been known a rubber composition prepared using, as a rubber component, a styrene-butadiene copolymer rubber (SBR) having a high glass transition temperature (Tg), a rubber composition prepared by compounding, in a rubber component, a resin having a high softening point as a substitute for a part of process oil in an amount equivalent to that of the substituted process oil, a rubber composition containing a softening agent or a carbon black in a high amount, a rubber composition prepared using a carbon black having a small particle size, or a rubber composition prepared by blending a combination of the above-mentioned SBR, resin having a high softening point, softening agent or carbon black.

However, in the case of a rubber composition prepared using SBR having a high Tg, there is a problem that temperature dependency is increased and variation of performance caused by a temperature change becomes large. Also, in case of a rubber composition where a resin having a high softening point is compounded to a rubber component as a substitute for a part of process oil in an amount equivalent to that of the substituted process oil, there is a problem that temperature dependency increases due to an influence of the resin having a high softening point if the substitution amount is large. Further, in the case of using a carbon black having a small particle size or a softening agent in a large amount, there is a problem that dispersion of the carbon black is not good and abrasion resistance is lowered.

In order to solve these problems, a rubber composition prepared using a low molecular weight styrene-butadiene copolymer has been proposed (See Patent Document 1). However, since the low molecular weight styrene-butadiene copolymer has a double bond having crosslinkability, there is a problem that a part of low molecular weight components form crosslinking with a matrix rubber component to be incorporated in the matrix and hysteresis cannot be inhibited sufficiently. Also, when double bonds are modified to saturated bonds by hydrogenation in order to prevent low molecular weight components from being incorporated in the matrix as a result of crosslinking, there arise a problem that compatibility with the matrix is significantly lowered and as a result, bleeding of the low molecular weight components occurs.

In order to inhibit bleeding of the low molecular weight components, there is a method of increasing a styrene content in the low molecular weight styrene-butadiene copolymer up to 40% or more. However, there is a problem that if the styrene content is increased, hardness increases, which makes handling difficult.

The present situation is such that, in any of the above-mentioned cases, so far there has not been obtained a rubber composition for a tire tread which can solve the above-mentioned problems at a high level.

Myrcene is a natural organic compound and is a kind of olefin belonging to monoterpene. There are two kinds of isomers as myrcene such as α-myrcene (2-methyl-6-methyleneocta-1,7-diene) and β-myrcene (7-methyl-3-methyleneocta-1,6-diene). In Patent Document 2, a polymer of myrcene is disclosed.

Farnesene is a kind of isoprenoid compound synthesized chemically by oligomerization of isoprene or dehydration reaction of nerolidol, and is used mainly as a perfume or its starting material (Patent Document 3).

PRIOR ART DOCUMENTS

Patent Documents

Patent Document 1: JP 63-101440 A
Patent Document 2: JP 63-179908 A
Patent Document 3: JP 2008-156516 A

SUMMARY OF THE INVENTION

Problem to be Solved by the Invention

An object of the present invention is to provide a novel branched conjugated diene copolymer being useful for improvement of processability, in particular, a novel hydrogenated branched conjugated diene copolymer being useful as a component for a rubber composition for a tire which enhances both of abrasion resistance and grip performance to a high level while exhibiting excellent processability and inhibits generation of bleeding, a rubber composition for a tire comprising the copolymer, and a pneumatic tire produced using the rubber composition for a tire.

Further, an object of the present invention is to provide a novel branched conjugated diene copolymer as a component for a rubber composition for a tire being useful for improvement of processability, a rubber composition for a tire comprising the branched conjugated diene copolymer, particularly a rubber composition for a tire enhancing both of abrasion resistance and grip performance to a high level and exhibiting excellent processability, and a pneumatic tire produced using the rubber composition for a tire.

Means to Solve the Problem

As a result of an extensive study to solve the above-mentioned problems, it was found that a novel copolymer having improved processability and the like can be obtained by using a branched conjugated diene having multi-branched side chains as a conjugated diene compound for which usually butadiene, isoprene or the like is used, and further study was made and the present invention was completed.

The present invention relates to a hydrogenated branched conjugated diene copolymer prepared by copolymerizing a branched conjugated diene compound (1) represented by the general formula (1):

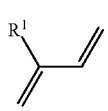

(1)

wherein $R^1$ is an aliphatic hydrocarbon having 6 to 11 carbon atoms, a conjugated diene compound represented by the general formula (2):

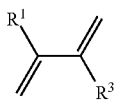

(2)

wherein $R^2$ and $R^3$ are the same or different and each is a hydrogen atom, an aliphatic hydrocarbon group having 1 to 3 carbon atoms or a halogen atom, and/or
a vinyl compound represented by the general formula (3):

(3)

wherein $R^4$ is a hydrogen atom, an aliphatic hydrocarbon group having 1 to 3 carbon atoms, an alicyclic hydrocarbon group having 3 to 8 carbon atoms, or an aromatic hydrocarbon group having 6 to 10 carbon atoms,
and then hydrogenating the resulting copolymer,
wherein a copolymerization ratio (1) of the branched conjugated diene compound (1) is 1 to 99% by weight, a copolymerization ratio (m) of the conjugated diene compound (2) is 99 to 0% by weight, and a copolymerization ratio (n) of the vinyl compound (3) is 99 to 0% by weight.

It is preferable that the above-mentioned hydrogenated branched conjugated diene copolymer is intended for improvement of processability, wherein a Mooney viscosity $ML_{1+4}$ (130° C.) of a rubber composition to which the copolymer is blended is lower compared with a polymer prepared by replacing the branched conjugated diene compound (1) by the conjugated diene compound (2) and having the same weight-average molecular weight.

It is preferable that the above-mentioned hydrogenated branched conjugated diene copolymer has a weight-average molecular weight of 2,000 to 200,000.

It is preferable that a hydrogenation ratio of the above-mentioned hydrogenated branched conjugated diene copolymer is 10 to 90%.

It is preferable that the copolymerization ratio (n) of the vinyl compound (3) in the above-mentioned hydrogenated branched conjugated diene copolymer is 40% by weight or more.

In the above-mentioned hydrogenated branched conjugated diene copolymer, it is preferable that the branched conjugated diene compound (1) is myrcene and/or farnesene.

In the above-mentioned hydrogenated branched conjugated diene copolymer, it is preferable that the conjugated diene compound (2) is 1,3-butadiene and/or isoprene.

In the above-mentioned hydrogenated branched conjugated diene copolymer, it is preferable that the vinyl compound (3) is one or more selected from the group consisting of styrene, α-methylstyrene, α-vinylnaphthalene and 3-vinylnaphthalene.

Further, the present invention relates to a rubber composition comprising the above-mentioned hydrogenated branched conjugated diene copolymer.

Furthermore, the present invention relates to a pneumatic tire produced using the above-mentioned rubber composition.

Further, in another aspect, the present invention relates to a branched conjugated diene copolymer prepared by copolymerizing a branched conjugated diene compound represented by the general formula (1):

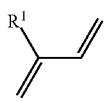

(1)

wherein the symbol has the same meaning as described above, and a vinyl compound represented by the general formula (3):

(3)

wherein the symbol has the same meaning as described above,
wherein a copolymerization ratio (1) of the branched conjugated diene compound (1) is 1 to 99% by weight, and a copolymerization ratio (n) of the conjugated diene compound (3) is 99 to 1% by weight.

In the above-mentioned branched conjugated diene copolymer, it is preferable that the copolymerization ratio (1) of the branched conjugated diene compound (1) is 2.5 to 75% by weight and the copolymerization ratio (n) of the vinyl compound (3) is 97.5 to 25% by weight.

It is preferable that the above-mentioned branched conjugated diene copolymer is lower in a Mooney viscosity $ML_{1+4}$ (130° C.) compared with a polymer which has the same weight-average molecular weight and in which the branched conjugated diene compound (1) is replaced by the conjugated diene compound (2).

It is preferable that the branched conjugated diene compound (1) is myrcene and/or farnesene.

It is preferable that the vinyl compound (3) is one or more selected from the group consisting of styrene, α-methylstyrene, α-vinylnaphthalene and β-vinylnaphthalene.

Further, the present invention relates to a rubber composition comprising the above-mentioned branched conjugated diene copolymer.

Furthermore, the present invention relates to a pneumatic tire produced using the above-mentioned rubber composition.

Effects of the Invention

The present invention can provide a novel branched conjugated diene copolymer as a component for a rubber composition for a tire being useful for improvement of processability, in particular, a novel hydrogenated branched conjugated diene copolymer being useful as a component for a rubber composition for a tire which enhances both of abrasion resistance and grip performance to a high level while exhibiting excellent processability and inhibits generation of bleeding, and a rubber composition for a tire comprising the copolymer. Such a rubber composition for a tire of the present invention is useful as a rubber for a tire tread, particularly as a rubber composition for a tire for racing. Further, according to the present invention, a pneumatic tire prepared using the rubber composition for a tire can be provided.

Particularly, in the present invention, even in the case where a styrene content in the low molecular weight hydrogenated branched conjugated diene copolymer (the weight-average molecular weight is from about 2,000 to about 200,000) is high (for example, the styrene content in the copolymer is 40% by weight or more) to keep compatibility with a rubber component and inhibit generation of bleeding, it is possible, by using the branched conjugated diene compound (1) as a conjugated diene compound, to improve processability and to prevent handling property from lowering due to too hard rubber.

Further, in another aspect of the present invention, a novel branched conjugated diene copolymer as a component for a rubber composition for a tire being useful for improvement of processability can be provided, and by using the branched conjugated diene copolymer, the rubber composition enhancing both of abrasion resistance and grip performance to a high level and being excellent in processability can be provided.

The rubber composition for a tire of the present invention is useful as a rubber composition for a tire tread, side rubber or a rubber for a case member for ordinary vehicles, trucks, buses, light trucks, small-sized trucks, motorcycles, motorized bicycles or industrial vehicles and is useful particularly as a rubber composition for a tire tread.

EMBODIMENT FOR CARRYING OUT THE INVENTION

<Hydrogenated Branched Conjugated Diene Copolymer>

The hydrogenated branched conjugated diene copolymer of the present invention means a copolymer obtained by copolymerizing the branched conjugated diene compound (1), the conjugated diene compound (2) and/or the vinyl compound (3), and then subjecting the resulting copolymer to hydrogenation.

The weight-average molecular weight (Mw) of the hydrogenated branched conjugated diene copolymer of the present invention is not limited particularly as long as it is 1,000 or more, and is preferably 2,000 or more. If Mw is less than 1,000, there is a tendency that the copolymer becomes a liquid polymer having high fluidity. On the other hand, Mw is not limited as long as it is 3,000,000 or less. When Mw is more than 3,000,000, there is a tendency that the copolymer is in a solid form having no rubber elasticity.

From the viewpoint of enhancing both of grip performance and abrasion resistance, Mw is preferably 3,000 or more, more preferably 5,000 or more. When Mw is less than 3,000, there is a tendency that sufficient abrasion resistance cannot be obtained. On the other hand, Mw is preferably 200,000 or less, more preferably 100,000 or less. When Mw is more than 200,000, there is a tendency that sufficient grip performance cannot be obtained.

The number-average molecular weight (Mn) of the hydrogenated branched conjugated diene copolymer is preferably 3,000 or more, more preferably 250,000 or more. Otherwise, there is a tendency that it does not lead to a problem that a hardness of the rubber composition increases and processability is deteriorated. On the other hand, Mn is preferably 3,000,000 or less, more preferably 2,000,000 or less. When Mn is more than 3,000,000, there is a tendency that the copolymer is in a solid form having no rubber elasticity.

In the hydrogenated branched conjugated diene copolymer, a preferable range of a ratio of Mw/Mn is 20.0 or less, more preferably 10.0 or less. When Mw/Mn is more than 20.0, there is a tendency that it does not leads to a problem that processability is deteriorated since a hardness of the rubber composition decreases. On the other hand, a lower limit of the Mw/Mn is not limited particularly, and when it is 1.0 or more, no problem arises.

In the hydrogenated branched conjugated diene copolymer, the hydrogenation ratio is not limited particularly as long as it is within a range so as not to cause bleeding in the case where the hydrogenated branched conjugated diene copolymer is blended to other rubber components. Such a range of the hydrogenation ratio is 10 to 90%, preferably 30 to 70%.

The glass transition temperature (Tg) of the hydrogenated branched conjugated diene copolymer is usually within a range of −80° C. to 110° C. For example, Tg is preferably −70° C. to 70° C., more preferably −30° C. to 30° C.

A Mooney viscosity $ML_{1+4}$ (130° C.) of the hydrogenated branched conjugated diene copolymer is not limited particularly because an effect of improving processability in the present invention can be exhibited as long as the viscosity is lower compared with a polymer which has the same molecular weight and in which the branched conjugated diene compound (1) constituting the copolymer is replaced by 1,3-butadiene. Generally the Mooney viscosity is preferably 25 or more, more preferably 30 or more. When the Mooney viscosity is less than 25, the copolymer tends to have fluidity. On the other hand, the Mooney viscosity is preferably 160 or less, more preferably 150 or less, further preferably 100 or less, further preferably 60 or less. If the Mooney viscosity exceeds 160, there is a tendency that large amounts of a softening agent and processing aid are necessary at the time of processing.

Also, for comparison, a Mooney viscosity of a rubber composition obtained by blending the hydrogenated branched conjugated diene copolymer thereto can be used. Namely, a Mooney viscosity $ML_{1+4}$ (130° C.) of a rubber composition obtained by blending the hydrogenated branched conjugated diene copolymer shows a lower value in comparison with a polymer which has the same weight-average molecular weight and in which the branched conjugated diene compound (1) is replaced by the conjugated diene compound (2). In this case, a preferable Mooney viscosity is the same as mentioned above for the copolymer.

<Branched Conjugated Diene Copolymer>

Any of the above descriptions on the hydrogenated branched conjugated diene copolymer can be applied to the branched conjugated diene copolymer of the present invention unless there is an apparent inconsistency.

In the copolymer of the present invention, copolymerization ratios of the branched conjugated diene compound (1), the conjugated diene compound (2), and the vinyl compound (3) which are monomers are described.

<Regarding the Copolymer of the Branched Conjugated Diene Compound (1) and the Conjugated Diene Compound (2) or the Vinyl Compound (3)>

The copolymerization ratio (1) of the branched conjugated diene compound (1) is not limited particularly as long as it is 1 to 99% by weight. The copolymerization ratio is preferably 2.5% by weight or more, further preferably 5% by weight or more. If the copolymerization ratio is less than 1% by weight, there is a tendency that a sufficient effect of improving processability by blending the branched conjugated diene compound (1) cannot be obtained. On the other hand, the copolymerization ratio is preferably 75% by weight or less, more preferably 60% by weight or less, further preferably 50% by weight or less, further preferably 15% by weight or less. This is because when the copolymerization ratio is more than 99% by weight, the copolymer tends to be a polymer having fluidity, and when the compound is blended in a copolymerization ratio of as much as 15% by weight, there is a tendency that a sufficient effect resulting from the blending of the branched conjugated diene compound (1) for improvement of processability can be exhibited.

The preferable range of the copolymerization ratio (m) of the conjugated diene compound (2) is 1% by weight or more, preferably 30% by weight or more, more preferably 50% by weight or more. If "m" is less than 1% by weight, the copolymer tends to be a polymer having fluidity. On the other hand, the copolymerization ratio is 99% by weight or less, more preferably 80% by weight or less, further preferably 72.5% by weight or less, further preferably 55% by weight or less. If "m" is more than 99% by weight, there is a tendency that an effect of copolymerizing the branched conjugated diene compound (1) for improving processability is decreased.

The preferable range of the copolymerization ratio (n) of the vinyl compound (3) is 10% by weight or more, more preferably 25% by weight or more, further preferably 40% by weight or more. If "n" is less than 10% by weight, there is a tendency that a hardness of a rubber is not so high as to raise a concern on processability and an effect of copolymerizing the branched conjugated diene compound (1) for improving processability is decreased. If "n" is 25% by weight or more, it is preferable because there is a tendency that grip performance of a rubber is enhanced and, in addition, that an effect of improving processability by blending the branched conjugated diene compound (1) is exhibited significantly since there arises a problem that processability of the copolymer is deteriorated. Such a tendency is seen further significantly in the case of "n" being 40% by weight or more. The copolymerization ratio is 99% by weight or less, preferably 97.5% by weight or less, more preferably 95% by weight or less, further preferably 80% by weight or less, further preferably 60% by weight or less. If "n" is more than 99% by weight, there is a tendency that the copolymer becomes not in the form of rubber but in the form of resin and an effect resulting from copolymerization of the branched conjugated diene compound (1) is decreased.

In the branched conjugated diene copolymer, since the total of the polymerization ratios of the monomers is 100% by weight, the total of "1" and "m" or "1" and "n" is 100% by weight. Therefore, if the polymerization ratio of any one thereof is selected from the above-mentioned preferable ranges of "1", "m" or "n", the other polymerization ratios are determined accordingly.

<Regarding Copolymer of Branched Conjugated Diene Compound (1), Conjugated Diene Compound (2) and Vinyl Compound (3)>

The copolymerization ratio (1) of the branched conjugated diene compound (1) is not limited particularly as long as it is 1 to 99% by weight. The copolymerization ratio is preferably 2.5% by weight or more, further preferably 5% by weight or more. If the copolymerization ratio is less than 1% by weight, there is a tendency that a sufficient effect of improving processability by blending the branched conjugated diene compound (1) cannot be obtained. On the other hand, the copolymerization ratio is preferably less than 75% by weight, more preferably less than 60% by weight, further preferably less than 50% by weight, further preferably less than 15% by weight. This is because when the copolymerization ratio is more than 99% by weight, there is a case where the copolymer becomes a polymer having fluidity, and when the compound is blended in a copolymerization ratio of as much as 15% by weight, there is a tendency that a sufficient effect resulting from the blending of the branched conjugated diene compound (1) for improvement of processability can be exhibited.

The copolymerization ratio (m) of the conjugated diene compound (2) is more than 0% by weight, and the preferably 1% by weight or more, more preferably 30% by weight or more, further preferably 50% by weight or more. If "m" is less than 1% by weight, the copolymer tends to be a polymer having fluidity. On the other hand, the copolymerization ratio is less than 99% by weight, more preferably less than 80% by weight, further preferably less than 72.5% by weight, further preferably less than 55% by weight. If "m" is 99% by weight or more, there is a tendency that an effect of copolymerizing the branched conjugated diene compound (1) for improving processability is decreased.

The copolymerization ratio (n) of the vinyl compound (3) is more than 0% by weight, and the preferably 1% by weight or more, more preferably 10% by weight or more, further preferably 25% by weight or more, further preferably 40% by weight or more. If "n" is less than 10% by weight, there is a tendency that a hardness of a rubber is not so high as to raise a concern on processability and an effect of copolymerizing the branched conjugated diene compound (1) for improving processability is decreased. If "n" is 25% by weight or more, it is preferable because there is a tendency that grip performance of a rubber is enhanced and, in addition, that an effect of improving processability by blending the branched conjugated diene compound (1) is exhibited significantly since there arises a problem that processability of the copolymer is deteriorated. Such a tendency is seen further significantly in the case of "n" being 40% by weight or more. The copolymerization ratio is less than 99% by weight, preferably less than 97.5% by weight, more preferably less than 95% by weight, further preferably less than 80% by weight, further preferably less than 60% by weight. If "n" is 99% by weight or more, there is a tendency that the copolymer becomes not in the form of rubber but in the form of resin and an effect resulting from copolymerization of the branched conjugated diene compound (1) is decreased.

In the branched conjugated diene copolymer, since the total of the copolymerization ratios "1" of the branched conjugated diene compound (1), "m" of the conjugated diene compound (2), and "n" of the vinyl compound (3) is 100% by weight, when the lower limit of any one of them is selected from the above-mentioned preferable range, allowable ranges of the upper limits of the other two are determined accordingly. Also, when the lower limits of any two of them are selected from the above-mentioned preferable ranges, the upper limit of the other one is determined accordingly. Similarly, with respect to the copolymerization ratios "I", "m" and "n", when the upper limit of any one of them is selected from the above-mentioned preferable range, allowable ranges of the lower limits of the other two are determined accordingly. Also, when the upper limits of any two of them are selected from the above-mentioned preferable ranges, the lower limit of the other one is determined accordingly.

<Branched Conjugated Diene Compound (1)>

In the branched conjugated diene compound (1), examples of the aliphatic hydrocarbon group having 6 to 11 carbon atoms are those having a normal structure such as hexyl, heptyl, octyl, nonyl, decyl and undecyl, isomers and/or unsaturated forms thereof, and derivatives thereof (for example, halides, hydroxides, and the like). Preferred examples are 4-methyl-3-pentenyl group, 4,8-dimethyl-nona-3,7-dienyl group, and the like, and derivatives thereof.

Examples of the branched conjugated diene compound (1) are myrcene, farnesene, and the like.

In the present invention, "myrcene" includes α-myrcene (2-methyl-6-methyleneocta-1,7-diene) and β-myrcene, and among these, β-myrcene (7-methyl-3-methyleneocta-1,6-diene) having the following structure is preferred.

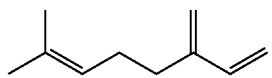

(4)

On the other hand, "farnesene" includes any isomers such as α-farnesene ((3E,7E)-3,7,11-trimethyl-1,3,6,10-dodeca-tetraene) and β-farnesene, and among these, (E)-β-farnesene (7,11-dimethyl-3-methylene-1,6,10-dodecatriene) having the following structure is preferred.

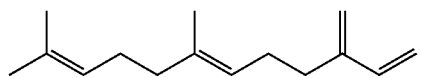

(5)

The branched conjugated diene compounds (1) can be used alone or in combination of two or more thereof.

<Regarding Conjugated Diene Compound (2)>

In the conjugated diene compound (2), examples of the aliphatic hydrocarbon group having 1 to 3 carbon atoms are methyl, ethyl, n-propyl, isopropyl, and the like, and among these, methyl is preferred. Examples of the halogen atom are fluorine, chlorine, bromine and iodine, and among these, chlorine is preferred. Examples of the conjugated diene compound (2) are preferably 1,3-butadiene, isoprene, 2,3-dimethyl-1,3-butadiene, and the like, and among these, 1,3-butadiene and isoprene are preferred. The conjugated diene compounds (2) can be used alone or in combination of two or more thereof.

<Regarding Vinyl Compound (3)>

In the vinyl compound (3), examples of the aliphatic hydrocarbon group having 1 to 3 carbon atoms are preferably methyl, ethyl, n-propyl, isopropyl, and the like, and among these, methyl is preferred. Examples of the alicyclic hydrocarbon group having 3 to 8 carbon atoms are cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, cyclooctenyl, and the like, and among these, cyclopropyl and cyclobutyl are preferred. Examples of the aromatic hydrocarbon group having 6 to 10 carbon atoms are phenyl, benzyl, phenethyl, tolyl, xylyl, naphthyl, and the like. The substitution position of methyl on the benzene ring of tolyl includes any of ortho, meta and para positions, and the substitution position of methyl in xylyl also includes any of optional substitution positions.

Among these groups, preferred are phenyl, tolyl and naphthyl. Examples of the preferred vinyl compound (3) are styrene, α-methylstyrene, α-vinylnaphthalene and β-vinylnaphthalene. The vinyl compounds (3) can be used alone or in combination of two or more thereof.

The preparation method of the copolymer according to the present invention is described.

In the copolymerization of the branched conjugated diene compound (1) and the conjugated diene compound (2) and/or the vinyl compound (3), an order of copolymerization of monomers is not limited particularly as long as each monomer component is copolymerized. For example, all monomers may be subjected to random copolymerization simultaneously, or after previously copolymerizing specific monomer or monomers (for example, only the branched conjugated diene compound (1) monomer, only the conjugated diene compound (2) monomer, only the vinyl compound (3) monomer, or any of monomers arbitrarily selected from these), the remaining monomers or monomer may be added and copolymerized, or each monomer may be previously copolymerized respectively, and then subjected to block copolymerization.

Such copolymerization can be carried out by a usual method, for example, by anionic polymerization reaction, coordination polymerization, or the like.

A polymerization method is not limited particularly, and any of a solution polymerization method, an emulsion polymerization method, a gas phase polymerization method and a bulk polymerization method can be used. Among these, a solution polymerization method is preferred. The polymerization may be carried out batchwise or continuously.

<Anionic Polymerization>

The anionic polymerization can be carried out in a proper solvent in the presence of an anionic initiator. As an anionic initiator, any of usual ones can be used suitably, and examples of such an anionic initiator are organolithium compounds having a general formula RLix (R is an aliphatic, aromatic or alicyclic group having one or more carbon atoms, x is an integer of 1 to 20). Examples of proper organolithium compounds are methyllithium, ethyllithium, n-butyllithium, sec-butyllithium, tert-butyllithium, phenyllithium and naphthyllithium. Preferred organolithium compounds are n-butyllithium and sec-butyllithium. Anionic initiators can be used alone or in a mixture of two or more thereof. If the amount of the polymerization initiator is less than 0.05 mmol, there is a tendency that the copolymer becomes not in the form of rubber but in the form of resin, and if the amount of the polymerization initiator is more than 35 mmol, there is a tendency that the copolymer is soft and an effect produced by copolymerizing the branched conjugated diene compound (1) for processability is decreased.

As a solvent to be used for the anionic polymerization, any of solvents can be used suitably as long as they neither inactivate the anionic initiator nor stop the polymerization reaction, and any of polar solvents and nonpolar solvents can be used. Examples of polar solvents are ether solvents such as tetrahydrofuran, and examples of nonpolar solvents are chain hydrocarbons such as hexane, heptane, octane and pentane, cyclic hydrocarbons such as cyclohexane, aromatic hydrocarbons such as benzene, toluene and xylene, and the like. These solvents can be used alone or in a mixture of two or more thereof.

It is further preferable to carry out the anionic polymerization in the presence of a polar compound. Examples of polar compounds are dimethyl ether, diethyl ether, ethyl methyl ether, ethyl propyl ether, tetrahydrofuran, dioxane, diphenyl ether, tripropylamine, tributylamine, trimethylamine, triethylamine, N,N,N',N'-tetramethylethylenediamine (TMEDA), and the like. Polar compounds can be used alone or in a mixture of two or more thereof. The polar compound is relevant to controlling the micro structure of butadiene portion and useful for reducing the content of 1,2-structure. The amount of polar compound varies depending on kind thereof and the polymerization conditions, and a molar ratio thereof to the anionic initiator (polar compound/anionic initiator) is preferably 0.1 or more. When the molar ratio of the polar compound to the anionic initiator (polar compound/anionic initiator) is less than 0.1, there is a tendency that an effect of using the polar compound for controlling the micro structure is not sufficient.

The reaction temperature of the anionic polymerization is not limited particularly as long as the reaction advances properly, and usually is preferably from −10° C. to 100° C., more preferably from 25° C. to 70° C. In addition, the reaction time varies depending on charging amounts, reaction temperature and other conditions, and usually, for example, about 3 hours is sufficient.

The above-mentioned anionic polymerization can be terminated by adding a reaction inhibitor to be usually used in this field. Examples of the reaction inhibitor are polar solvents having an active proton such as alcohols, for example, methanol, ethanol and isopropanol or acetic acid, a mixture thereof, or a mixture of the polar solvents with nonpolar solvents such as hexane and cyclohexane. A sufficient amount of reaction inhibitor is usually an equimolar amount or two-fold molar amount to the anionic initiator.

After the polymerization reaction, the branched conjugated diene copolymer can be separated from the polymerization solution easily by removing the solvent by a usual method or by pouring the polymerization solution in an alcohol of an amount equal to or more than the amount of polymerization solution and precipitating the branched conjugated diene copolymer.

<Coordination Polymerization>

The coordination polymerization can be carried out using a coordination polymerization initiator instead of the anionic initiator in the anionic polymerization. Any of usual coordination polymerization initiators can be suitably used, and examples thereof are catalysts that are transition metal-containing compounds such as lanthanoid compounds, titanium compounds, cobalt compounds and nickel compounds. In addition, if desired, an aluminum compound or a boron compound can be used as a co-catalyst.

The lanthanoid compound is not limited particularly as long as it contains any of elements (lanthanoids) of atomic numbers 57 to 71, and among these lanthanoids, neodymium is preferred particularly. Examples of the lanthanoid compounds are carboxylates, β-diketone complexes, alkoxides, phosphates, phosphites, halides and the like of these elements. Among these, from the viewpoint of easy handling, carboxylates, alkoxides, and β-diketone complexes are preferred. Examples of the titanium compounds are titanium-containing compounds having a cyclopentadienyl group, an indenyl group, a substituted cyclopentadienyl group, or a substituted indenyl group and also having 1 to 3 substituents selected from a halogen, an alkoxysilyl group and an alkyl group, and preferred are compounds having one alkoxysilyl group from the viewpoint of catalytic activity. Examples of the cobalt compounds are halides, carboxylates, β-diketone complexes, organic base complexes, organic phosphine complexes, and the like of cobalt. Examples of the nickel compounds are halides, carboxylates, β-diketone complexes, organic base complexes, and the like of nickel. Catalysts to be used as a coordination polymerization initiator can be used alone or in combination of two or more thereof.

Examples of the aluminum compounds to be used as a co-catalyst are organic aluminoxanes, halogenated organoaluminum compounds, organoaluminum compounds, hydrogenated organoaluminum compounds, and the like. Examples of the organic aluminoxanes are alkyl aluminoxanes (such as methyl aluminoxane, ethyl aluminoxane, propyl aluminoxane, butyl aluminoxane, isobutyl aluminoxane, octyl aluminoxane, and hexyl aluminoxane); examples of the halogenated organoaluminum compounds are halogenated alkyl aluminum compounds (such as dimethyl aluminum chloride, diethyl aluminum chloride, methyl aluminum dichloride, and ethyl aluminum dichloride); examples of the organoaluminum compounds are alkyl aluminum compounds (such as trimethylaluminum, triethylaluminum, triisopropylaluminum, and triisobutylaluminum); and examples of the hydrogenated organoaluminum compounds are hydrogenated alkyl aluminum compounds (such as diethylaluminum hydride, and diisobutylaluminum hydride). Examples of the boron compounds are compounds having anion species such as tetraphenylborate, tetrakis(pentafluorophenyl)borate, and (3,5-bistrifluoromethylphenyl)borate. These co-catalysts can also be used alone or in combination of two or more thereof.

In the coordination polymerization, the solvents and the polar compounds described in the anionic polymerization can be used similarly. In addition, the reaction time and the reaction temperature are the same as those described in the anionic polymerization. Termination of the polymerization reaction and separation of the branched conjugated diene copolymer can also be carried out in the same manner as in the anionic polymerization.

<Hydrogenation>

The hydrogenation reaction of the branched conjugated diene copolymer obtained above can be carried out by a usual method, and any of catalytic hydrogenation using a metal catalyst and a method using hydrazine can be used suitably (JP 59-161415 A, etc.). For example, catalytic hydrogenation using a metal catalyst can be carried out in an organic solvent in the presence of a metal catalyst by adding hydrogen under a pressure, and tetrahydrofuran, methanol, ethanol, or the like can be used suitably as the organic solvent. These organic solvents can be used alone or in a mixture of two or more thereof. Also, any of palladium, platinum, rhodium, ruthenium, nickel, and the like can be used suitably as the metal catalyst. These metal catalysts can be used alone or in a mixture of two or more thereof. A pressure to be applied is, for example, preferably 1 to 300 $kgf/cm^2$.

The weight-average molecular weight (Mw) of the branched conjugated diene copolymer according to the present invention can be controlled by a usual method, for example, by adjusting the amounts of monomers, to the catalyst, to be charged at the polymerization. For example, by increasing the ratio of all monomers to the anionic polymerization catalyst or the ratio of all monomers to the coordination polymerization catalyst, Mw can be increased, and by decreasing the ratio, Mw can be decreased. The same is true also for the number-average molecular weight (Mn) of the branched conjugated diene copolymer.

Tg of the branched conjugated diene copolymer according to the present invention can be controlled by a usual method. For example, by increasing the charging amount of branched conjugated diene compound (1) monomer, Tg can be made relatively low, and by increasing the charging amount of vinyl compound (3), Tg can be made relatively high.

The Mooney viscosity of the branched conjugated diene copolymer according to the present invention can be controlled by a usual method, for example, by adjusting the amount of branched conjugated diene compound (1) monomer to be charged at the polymerization. For example, by decreasing the charging amount of branched conjugated diene compound (1) monomer, the Mooney viscosity is increased, and on the contrary, by increasing the charging amount of branched conjugated diene compound (1) monomer, the Mooney viscosity is decreased.

<Rubber Composition Prepared Using Hydrogenated Branched Conjugated Diene Copolymer>

By blending other components which are usually used in the field of rubber industry with the thus obtained branched conjugated diene copolymer of the present invention, a rubber composition for a tire can be prepared. Examples of the components to be blended in the rubber composition of the present invention are rubber components, a filler, a silane coupling agent, and the like.

In the rubber composition for a tire of the present invention, the amount of the hydrogenated branched conjugated diene copolymer in the rubber components is about 3% by weight or more, preferably about 5% by weight or more, more preferably 30% by weight or more, further preferably 50% by weight or more. When the amount of the branched conjugated diene copolymer is less than 3% by weight, there is a tendency that the effect of blending the hydrogenated branched conjugated diene copolymer for processability is decreased. On the other hand, an upper limit of the amount of the branched conjugated diene copolymer is not limited particularly, and may be 100% by weight.

In the present invention, examples of the other rubber components to be used together with the hydrogenated branched conjugated diene copolymer are diene rubbers such as a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene propylene diene rubber (EPDM), a chloroprene rubber (CR), an acrylonitrile-butadiene rubber (NBR), a butyl rubber (IIR), and the like. These diene rubbers may be used alone or in combination of two or more thereof. Among these, it is preferable to use NR, BR, or SBR for the reason that a well-balanced grip performance and abrasion resistance can be obtained in combination use with the branched conjugated diene copolymer, and it is preferable to use SBR particularly for the reason that a high grip performance is exhibited.

Or, in the case where the hydrogenated branched conjugated diene copolymer according to the present invention is in a liquid form, it can be blended to a rubber composition as a component other than rubber components. In this case, the amount of the hydrogenated branched conjugated diene copolymer to be blended is 10 to 100 parts by weight, preferably 20 to 80 parts by weight, more preferably 30 to 70 parts by weight based on 100 parts by weight of the above-mentioned rubber components. If the amount is less than 10 parts by weight, there is a tendency that the effect of blending the hydrogenated branched conjugated diene copolymer for processability is decreased. On the other hand, if the amount is more than 100 parts by weight, there is a tendency that the effect of blending the hydrogenated branched conjugated diene copolymer for the balance of grip performance and abrasion resistance is decreased.

Examples of the filler are carbon black, silica, and the like which are commonly used in this field.

Carbon blacks which are used generally in production of tires can be used, and examples thereof are SAF, ISAF, HAF, FF, FEF, GPF, and the like. These carbon blacks can be used alone or in combination of two or more thereof. The nitrogen adsorption specific surface area ($N_2SA$) of carbon black is not less than about 80 $m^2/g$, preferably not less than about 110 $m^2/g$. When $N_2SA$ is less than 80 $m^2/g$, both of grip performance and abrasion resistance tend to be lowered. When $N_2SA$ is less than 110 $m^2/g$, an effect of using the branched conjugated diene copolymer for improving processability tends to be decreased. $N_2SA$ of carbon black is not more than about 270 $m^2/g$, preferably not more than about 260 $m^2/g$. When $N_2SA$ of carbon black is more than 270 $m^2/g$, dispersibility of carbon black tends to be decreased.

A blending amount of carbon black is about 1 part by weight or more, preferably about 3 parts by weight or more based on 100 parts by weight of the rubber components. When the blending amount of carbon black is less than 1 part by weight, abrasion resistance tends to be lowered. The blending amount of carbon black is not more than about 200 parts by weight, more preferably not more than 150 parts by weight. When the blending amount of carbon black exceeds 200 parts by weight, processability tends to be lowered.

As silica, for example, silica (anhydrous silica) prepared by a dry method and silica (hydrous silica) prepared by a wet method are exemplified. Among these, silica prepared by a wet method is preferred for the reason that there are many surface silanol groups and many reaction points with a silane coupling agent. $N_2SA$ of silica is not less than about 50 $m^2/g$, preferably not less than about 80 $m^2/g$. When $N_2SA$ is less than 50 $m^2/g$, there is a tendency that a reinforcing effect is small and abrasion resistance is decreased. $N_2SA$ of silica is not more than about 300 $m^2/g$, preferably not more than about 250 $m^2/g$. When $N_2SA$ is more than 300 $m^2/g$, there is a tendency that dispersibility of silica is decreased and processability is lowered.

A blending amount of silica is about 1 part by weight or more, preferably about 10 parts by weight or more based on 100 parts by weight of the rubber components. When the blending amount of silica is less than 1 part by weight, there is a tendency that abrasion resistance is not sufficient. The blending amount of silica is about 150 parts by weight or less, more preferably 100 parts by weight or less. When the blending amount of silica exceeds 150 parts by weight, there is a tendency that dispersibility of silica is decreased and processability is lowered.

It is preferable that the rubber composition comprises a silane coupling agent. As the silane coupling agent, a silane coupling agent which has been well-known can be used. Examples thereof are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, his (2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane, and the like. These silane coupling agents can be used alone or in combination of two or more thereof. From the viewpoint of good processability, it is preferable that among these, bis(3-triethoxysilylpropyl)tetrasulfide or bis(3-triethoxysilylpropyl)disulfide is contained in the rubber composition.

When the silane coupling agent is contained, the blending amount thereof is preferably 1 part by weight or more, more preferably 2 parts by weight or more based on 100 parts by weight of silica. When the amount of silane coupling agent is less than 1 part by weight, there is a tendency that a sufficient improving effect of dispersibility cannot be obtained. The amount of silane coupling agent is preferably 20 parts by weight or less, more preferably 15 parts by weight or less. When the amount of silane coupling agent exceeds 20 parts by weight, there is a tendency that a sufficient coupling effect cannot be obtained and a reinforcing property is decreased.

In addition to the above-mentioned components, compounding agents which have been used in the field of rubber industry, for example, other reinforcing filler, an antioxidant, an oil, a wax, a vulcanizing agent such as sulfur, a vulcanization accelerator, a vulcanization aid, and the like can be properly blended to the rubber composition of the present invention.

The thus obtained rubber composition of the present invention can be suitably used for a tire tread, in particular, for a tire tread for a racing tire since abrasion resistance and wet grip performance can be improved to a high level.

The rubber composition of the present invention can be used for production of tires and can be formed into tires by a usual method. Namely, a mixture obtained by optionally blending the above-mentioned components according to necessity is subjected to kneading, extrusion processing to a shape of each part of a tire at an unvulcanized stage, and molding on a tire molding machine by a usual method, thus forming an unvulcanized tire. A tire can be obtained by heating and compressing this unvulcanized tire in a vulcanizer, and by introducing air in the tire, a pneumatic tire can be obtained.

<Rubber Composition Prepared Using Branched Conjugated Diene Copolymer>

The above-mentioned description on the rubber composition prepared using the hydrogenated branched conjugated diene copolymer can be applied as it is to the rubber composition prepared using the branched conjugated diene copolymer unless there is apparent inconsistency.

Herein, Mw and Mn are measured using a gel permeation chromatograph (GPC), and are converted based on standard polystyrene.

A hydrogenation ratio (%) is obtained according to the following equation with iodine values calculated by an iodine value measuring method.

Hydrogenation ratio (%)=[{(Iodine value before hydrogenation)−(Iodine value after hydrogenation)}/(Iodine value before hydrogenation)]×100

A glass transition temperature (Tg) is measured with a differential scanning calorimeter (DSC).

A Mooney viscosity is measured in accordance with JIS K 6300.

A range simply indicated by, for example, "1 to 99% by weight" is construed so as to include the figures at both ends.

EXAMPLE

The present invention is described by means of Examples, but is not limited to the Examples.

Various chemicals used for synthesis of copolymers and preparation of rubber compositions in Examples and Comparative Examples are collectively shown below. Each chemical was subjected to purification by a usual method, if necessary.

<Various Chemicals Used for Synthesis of Copolymers>
Hexane: Anhydrous hexane available from Kanto Chemical Industry Co., Ltd.
Isopropanol: Isopropanol available from Kanto Chemical Industry Co., Ltd.
THF: Tetrahydrofuran available from Kanto Chemical Industry Co., Ltd.
Myrcene: β-myrcene available from Wako Pure Chemical Industries, Ltd.
Farnesene: (E)-β-Farnesene available from Nippon Terpene Chemicals, Inc. (reagent)
Isoprene: Isoprene available from Wako Pure Chemical Industries, Ltd. Butadiene: 1,3-Butadiene available from Takachiho Chemical Industrial Co., Ltd.
Styrene: Styrene available from Wako Pure Chemical Industries, Ltd.

<Various Chemicals Used for Preparation of Rubber Compositions>
Copolymer: Those synthesized in accordance with the description of this specification
SBR: Tufdene 4850 (S-SBR; Oil is contained in an amount of 50% based on 100 g of SBR solid content; Styrene content: 39% by weight) available from Asahi Kasei Chemicals Corporation
Carbon black: SHOBLACK N220 (Nitrogen adsorption specific surface area ($N_2SA$): 125 $m^2/g$) available from Cabot Japan K.K.
Antioxidant: NOCRAC 6C (N-1,3-dimethylbutyl-N'-phenyl-p-phenylenediamine) available from Ouchi Shinko Chemical Industrial Co., Ltd.
Stearic acid: Stearic acid available from NOF CORPORATION Zinc oxide: Zinc White Grade 1 available from Mitsui Mining & Smelting Co., Ltd.
Sulfur: Powdered sulfur available from Tsurumi Chemical Industry Co., Ltd.
Vulcanization accelerator: NOCCELER CZ (N-cyclohexyl-2-benzothiazolylsulfenamide) available from Ouchi Shinko Chemical Industrial Co., Ltd.

(A) Hydrogenated Myrcene Copolymers
1. Synthesis of Copolymers

Preparation Example 1-1 (Synthesis of Copolymer 1)

Into a 3-liter pressure resistant stainless steel vessel having been subjected to drying and replacement with nitrogen, 2000 ml of hexane, 110 g of butadiene, 90 g of styrene, and 0.22 mmol of TMEDA were poured, and further, 35 mmol of n-butyllithium (n-BuLi) was added thereto, followed by 5-hour polymerization reaction at 50° C. After the lapse of five hours, 1.15 ml of 1M isopropanol/hexane solution was added dropwise to terminate the reaction. After cooling, the reaction solution was subjected to air-drying overnight and then further drying under reduced pressure for two days. Thus, 200 g of Copolymer 1 was obtained. The degree of polymerization (percentage of dry weight/charged amount) was nearly 100%.

Preparation Example 2-1 (Synthesis of Copolymer 2)

Into a 1-liter pressure resistant stainless steel vessel, 200 g of Copolymer 1 obtained above, 300 g of THF and 10 g of 10% palladium carbon were poured, and replacement with nitrogen was carried out, followed by replacing with hydrogen to bring the inside pressure to 5.0 kgf/cm$^2$ and then reacting at 80° C. After the termination of the reaction, the reaction solution was filtrated to remove the palladium carbon, and the filtrate was subjected to air drying overnight and further drying under reduced pressure for two days. Thus, 200 g of Copolymer 2 was obtained. The degree of hydrogenation was 50%.

Preparation Example 3-1 (Synthesis of Copolymer 3)

Into a 1-liter glass vessel having been subjected to drying and replacement with nitrogen, 500 ml of hexane, 46 g of THF and 45 mmol of n-butyllithium (n-BuLi) were poured, followed by polymerization reaction while adding a mixture of 100 ml of hexane, 150 g of isoprene and 125 g of styrene dropwise into the reaction vessel over two hours. Immediately after completion of the addition of the mixture dropwise, 20 ml of 2M isopropanol/hexane solution was added dropwise to terminate the reaction. After cooling, the reaction solution was subjected to air-drying overnight and then further drying under reduced pressure for two days. Thus, 275 g of Copolymer 3 was obtained. The degree of polymerization was nearly 100%.

Preparation Example 4-1 (Synthesis of Copolymer 4)

200 Grams of Copolymer 3 was subjected to processing in the same manner as in Preparation Example 2-1 to obtain 200 g of Copolymer 4.

Preparation Example 5-1 (Synthesis of Copolymer 5)

Into a 1-liter glass vessel having been subjected to drying and replacement with nitrogen, 500 ml of hexane, 46 g of THF and 40 mmol of n-butyllithium (n-BuLi) were poured, followed by polymerization reaction while adding a mixture of 100 ml of hexane, 150 g of myrcene and 125 g of styrene dropwise into the reaction vessel over two hours. Immediately after completion of the addition of the mixture dropwise, 10 ml of 2M isopropanol/hexane solution was added dropwise to terminate the reaction. After cooling, the reaction solution was subjected to air-drying overnight and then further drying under reduced pressure for two days. Thus, 275 g of Copolymer 5 was obtained. The degree of polymerization was nearly 100%.

Preparation Example 6-1 (Synthesis of Copolymer 6)

200 Grams of Copolymer 5 was subjected to processing in the same manner as in Preparation Example 2-1 to obtain 200 g of Copolymer 6.

Preparation Example 7-1 (Synthesis of Copolymer 7)

Into a 1-liter pressure resistant stainless steel vessel having been subjected to drying and replacement with nitrogen, 500 ml of hexane, 46 g of THF and 40 mmol of n-butyllithium (n-BuLi) were poured, followed by polymerization reaction while adding a mixture of 100 ml of hexane, 95 g of butadiene, 55 g of myrcene and 125 g of styrene dropwise into the reaction vessel over two hours. Immediately after completion of the addition of the mixture dropwise, 10 ml of 2M isopropanol/hexane solution was added dropwise to terminate the reaction. The obtained reaction solution was subjected to air-drying overnight and then further drying under reduced pressure for two days. Thus, 275 g of Copolymer 7 was obtained. The degree of polymerization was nearly 100%.

Preparation Example 8-1 (Synthesis of Copolymer 8)

200 Grams of Copolymer 7 was subjected to processing in the same manner as in Preparation Example 2-1 to obtain 200 g of Copolymer 8.

Preparation Example 9-1 (Synthesis of Copolymer 9)

Processing was carried out in the same manner as in Preparation Example 7-1 except that 95 g of isoprene was used instead of 95 g of butadiene to obtain 275 g of Copolymer 9. The degree of polymerization was nearly 100%.

Preparation Example 10-1 (Synthesis of Copolymer 10)

200 Grams of Copolymer 9 was subjected to processing in the same manner as in Preparation Example 2-1 to obtain 200 g of Copolymer 8.

2. Preparation of Rubber Compositions and Tires

Preparation Example 1-2

(1) Copolymer 1 obtained above and the above-mentioned various chemicals for preparation of a rubber composition (except sulfur and vulcanization accelerator) were kneaded at 150° C. for five minutes in a Banbury mixer in accordance with the formulation shown in Table 2, and a kneaded product was obtained. Sulfur and vulcanization accelerator were added to the kneaded product, followed by 12-minute kneading at 170° C. using an open roll to obtain Unvulcanized Rubber Composition 1.

(2) Unvulcanized Rubber Composition obtained in (1) above was subjected to extrusion processing to a shape of a tire tread and molding with other members on a tire molding machine, thus forming an unvulcanized tire. This unvulcanized tire was subjected to 20-minute press-vulcanization at 170° C. in a vulcanizer to obtain a tire. Then, by introducing air in the tire, Pneumatic Tire 1 was obtained.

Preparation Examples 2-2 to 10-2

The respective starting compounds were subjected to processing in the same manner as in Preparation Example 1-2 in accordance with the formulation shown in Table 2 to obtain the respective Unvulcanized Rubber Compositions 2 to 10 and Pneumatic Tires 2 to 10.

branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

TABLE 1

| | Preparation Example | | | | | | | | | |
|---|---|---|---|---|---|---|---|---|---|---|
| | 1-1 | 2-1 | 3-1 | 4-1 | 5-1 | 6-1 | 7-1 | 8-1 | 9-1 | 10-1 |
| | Copolymer | | | | | | | | | |
| | 1 | 2 | 3 | 4 | 5 | 6 | 7 | 8 | 9 | 10 |
| (% by weight) | | | | | | | | | | |
| Myrcene | 0 | 0 | 0 | 0 | 55 | 55 | 20 | 20 | 20 | 20 |
| Butadiene | 55 | 55 | 0 | 0 | 0 | 0 | 35 | 35 | 0 | 0 |
| Isoprene | 0 | 0 | 55 | 55 | 0 | 0 | 0 | 0 | 35 | 35 |
| Styrene | 45 | 45 | 45 | 45 | 45 | 45 | 45 | 45 | 45 | 45 |
| Hydrogenation ratio (%) | 0 | 50 | 0 | 50 | 0 | 50 | 0 | 50 | 0 | 50 |
| Mw | 5000 | 5000 | 5113 | 4900 | 5320 | 5400 | 5200 | 5200 | 5369 | 5420 |
| Mn | 4800 | 4900 | 4789 | 4800 | 5120 | 5332 | 4905 | 4720 | 4880 | 4920 |
| Mw/Mn | 1.0 | 1.1 | 1.1 | 1.0 | 1.0 | 1.0 | 1.0 | 1.1 | 1.1 | 1.1 |
| Tg (° C.) | −13.4 | −14.0 | −5.1 | −6.0 | −20.6 | −19.0 | −15.1 | −16.2 | −10.1 | −9.2 |
| Mooney viscosity $ML_{1+4}$ (130° C.) | 43 | 47 | 52 | 59 | 32 | 38 | 37 | 39 | 36 | 40 |
| Copolymerization ratio (l) (% by weight) | — | — | — | — | 55.0 | 55.0 | 20.0 | 20.0 | 20.0 | 20.0 |

In the Table, "—" indicates that there was no detection. (hereinafter the same)

3. Results
<Copolymer>

With respect to the obtained Copolymers 1 to 10, weight-average molecular weight Mw, number-average molecular weight Mn, glass transition temperature Tg, Mooney viscosity and copolymerization ratio (1) were measured by the following methods. The results are shown in Table 1.

(Measurement of Weight-Average Molecular Weight Mw, Number-Average Molecular Weight Mn)

Mw and Mn were measured with an apparatus GPC-8000 Series available from TOSO CORPORATION and a differential refractometer as a detector, and were converted based on standard polystyrene.

(Measurement of Glass Transition Temperature (Tg))

With respect to each copolymer, measurement was carried out using a differential scanning calorimeter (DSC) at a heat-up rate of 10° C./min from an initial temperature of −150° C. to a final temperature of 150° C. to calculate Tg.

(Processability)

With respect to each copolymer, a Mooney viscosity $ML_{1+4}$ (130° C.) thereof was measured using a Mooney viscosity tester in accordance with JIS K 6300 "Test Method of Unvulcanized Rubber". After pre-heating to 130° C. for one minute, under this temperature condition, a large rotor was rotated and after a lapse of four minutes, the Mooney viscosity $ML_{1+4}$ (130° C.) was measured. It is indicated that the smaller the Mooney viscosity is, the better the processability is.

(Copolymerization Ratio (1) of Branched Conjugated Diene Compound (1))

The copolymerization ratio (1) (% by weight) was measured by a usual method using a pyrolysis gas chromatography (PGC). Namely, a calibration curve of a purified <Rubber Compositions and Tires>

The following tests were carried out using Unvulcanized Rubber Compositions 1 to 10 and Pneumatic Tires 1 to 10 obtained above. The results are shown in Table 2.

(Processability)

Test pieces of a given size were prepared from each of the above unvulcanized rubber compositions, and a Mooney viscosity $ML_{1+4}$ (130° C.) thereof was measured using a Mooney viscosity tester in accordance with JIS K 6300 "Test Method of Unvulcanized Rubber". The test piece was pre-heated to 130° C. for one minute and under this temperature condition, a large rotor was rotated and after a lapse of four minutes, the Mooney viscosity $ML_{1+4}$ (130° C.) was measured. It is indicated that the smaller the Mooney viscosity is, the better the processability is.

(Grip Performance)

In-vehicle running was carried out on a test course of an asphalt road surface using each pneumatic tire obtained above. A test driver evaluated stability control at steering in ten levels. It is indicated that the larger the value is, the more superior the grip performance is.

(Abrasion Resistance)

Test running was carried out 20 rounds of a test course using each pneumatic tire. A depth of a groove of the tire before and after the running was measured, and assuming that the abrasion resistance index of Pneumatic Tire 1 is 100, the depth of a groove of each pneumatic tire is represented by an index. It is indicated that the larger the value is, the higher and the more superior the abrasion resistance is.

(Bleed Resistance)

A surface of each pneumatic tire was observed and a degree of bleeding of an oily substance was evaluated with naked eyes.

○: No bleeding
Δ: Slightly bleeding
X: Vigorously bleeding

TABLE 2

| | Preparation Example | | | | | | | | | |
|---|---|---|---|---|---|---|---|---|---|---|
| | 1-2 | 2-2 | 3-2 | 4-2 | 5-2 | 6-2 | 7-2 | 8-2 | 9-2 | 10-2 |
| Blending amount (part by weight) | | | | | | | | | | |
| SBR | 150 | 150 | 150 | 150 | 150 | 150 | 150 | 150 | 150 | 150 |
| Copolymer 1 | 50 | | | | | | | | | |
| Copolymer 2 | | 50 | | | | | | | | |
| Copolymer 3 | | | 50 | | | | | | | |
| Copolymer 4 | | | | 50 | | | | | | |
| Copolymer 5 | | | | | 50 | | | | | |
| Copolymer 6 | | | | | | 50 | | | | |
| Copolymer 7 | | | | | | | 50 | | | |
| Copolymer 8 | | | | | | | | 50 | | |
| Copolymer 9 | | | | | | | | | 50 | |
| Copolymer 10 | | | | | | | | | | 50 |
| Carbon black | 100 | 100 | 100 | 100 | 100 | 100 | 100 | 100 | 100 | 100 |
| Antioxidant | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 |
| Sulfur | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 |
| Results of evaluation | | | | | | | | | | |
| Mooney viscosity $ML_{1+4}$ (130° C.) | 49.7 | 49.6 | 55.2 | 56.2 | 42.0 | 43.3 | 44.5 | 41.9 | 42.6 | 42.1 |
| Grip performance | 5 | 6 | 6 | 7 | 8 | 10 | 8 | 9 | 8 | 10 |
| Abrasion resistance | 100 | 109 | 101 | 110 | 105 | 104 | 107 | 124 | 118 | 128 |
| Bleed resistance | ○ | ○ | ○ | ○ | ○ | ○ | ○ | ○ | ○ | ○ |

As shown in Table 2, in Preparation Examples 5 to 10 in which the myrcene copolymer was blended, the Mooney viscosity is low and processability is improved. As shown, especially in Preparation Examples 6, 8 and 10 in which the hydrogenated myrcene copolymer was blended, processability is good, and also grip performance, abrasion resistance and bleed resistance are good.

(B) Hydrogenated Farnesene Copolymer
1. Synthesis of Copolymer

Preparation Example 11-1 (Synthesis of Copolymer 11)

Into a 3-liter pressure resistant stainless steel vessel having been subjected to drying and replacement with nitrogen, 2000 ml of hexane, 110 g of butadiene, 90 g of styrene, and 0.22 mmol of TMEDA were poured, and further, 35 mmol of n-butyllithium (n-BuLi) was added thereto, followed by 5-hour polymerization reaction at 50° C. After the lapse of five hours, 1.15 ml of 1M isopropanol/hexane solution was added dropwise to terminate the reaction. After cooling, the reaction solution was subjected to air-drying overnight and then further drying under reduced pressure for two days. Thus, 200 g of Copolymer 11 was obtained. The degree of polymerization (percentage of dry weight/charged amount) was nearly 100%.

Preparation Example 12-1 (Synthesis of Copolymer 12)

Into a 1-liter pressure resistant stainless steel vessel, 200 g of Copolymer 11 obtained above, 300 g of THF and 10 g of 10% palladium carbon were poured, and replacement with nitrogen was carried out, followed by replacing with hydrogen to bring the inside pressure to 5.0 kgf/cm$^2$ and then reacting at 80° C. After the termination of the reaction, the reaction solution was filtrated to remove the palladium carbon, and the filtrate was subjected to air drying overnight and further drying under reduced pressure for two days. Thus, 200 g of Copolymer 12 was obtained. The degree of hydrogenation was 50%.

Preparation Example 13-1 (Synthesis of Copolymer 13)

Into a 1-liter glass vessel having been subjected to drying and replacement with nitrogen, 500 ml of hexane, 46 g of THF and 45 mmol of n-butyllithium (n-BuLi) were poured, followed by polymerization reaction while adding a mixture of 100 ml of hexane, 150 g of isoprene and 125 g of styrene dropwise into the reaction vessel over two hours. Immediately after completion of the addition of the mixture dropwise, 20 ml of 2M isopropanol/hexane solution was added dropwise to terminate the reaction. After cooling, the reaction solution was subjected to air-drying overnight and then further drying under reduced pressure for two days. Thus, 275 g of Copolymer 13 was obtained. The degree of polymerization was nearly 100%.

Preparation Example 14-1 (Synthesis of Copolymer 14)

200 Grams of Copolymer 13 were subjected to processing in the same manner as in Preparation Example 12-1 to obtain 200 g of Copolymer 14.

Preparation Example 15-1 (Synthesis of Copolymer 15)

Into a 1-liter glass vessel having been subjected to drying and replacement with nitrogen, 500 ml of hexane, 46 g of THF and 40 mmol of n-butyllithium (n-BuLi) were poured, followed by polymerization reaction while adding a mixture of 100 ml of hexane, 150 g of farnesene and 125 g of styrene dropwise into the reaction vessel over two hours. Immediately after completion of the addition of the mixture dropwise, 10 ml of 2M isopropanol/hexane solution was added dropwise to terminate the reaction. After cooling, the reaction solution was subjected to air-drying overnight and then further drying under reduced pressure for two days. Thus, 275 g of Copolymer 15 was obtained. The degree of polymerization was nearly 100%.

Preparation Example 16-1 (Synthesis of Copolymer 16)

200 Grams of Copolymer 15 was subjected to processing in the same manner as in Preparation Example 12-1 to obtain 200 g of Copolymer 16.

Preparation Example 17-1 (Synthesis of Copolymer 17)

Processing was carried out in the same manner as in Preparation Example 15-1 except that 55 g of farnesene and 95 g of butadiene were used instead of 150 g of farnesene to obtain 275 g of Copolymer 17. The degree of polymerization was nearly 100%.

Preparation Example 18-1 (Synthesis of Copolymer 18)

200 Grams of Copolymer 17 was subjected to processing in the same manner as in Preparation Example 12-1 to obtain 200 g of Copolymer 18.

Preparation Example 19-1 (Synthesis of Copolymer 9)

Processing was carried out in the same manner as in Preparation Example 17-1 except that isoprene was used instead of butadiene to obtain 275 g of Copolymer 19. The degree of polymerization was nearly 100%.

Preparation Example 20-1 (Synthesis of Copolymer 20)

200 Grams of Copolymer 19 was subjected to processing in the same manner as in Preparation Example 12-1 to obtain 200 g of Copolymer 20.

2. Preparation of Rubber Compositions and Tires

Preparation Example 11-2

(1) Copolymer 11 obtained above and the above-mentioned various chemicals for preparation of a rubber composition (except sulfur and vulcanization accelerator) were kneaded at 150° C. for five minutes in a Banbury mixer in accordance with the formulation shown in Table 4, and a kneaded product was obtained. Sulfur and vulcanization accelerator were added to the kneaded product, followed by 12-minute kneading at 170° C. using an open roll to obtain Unvulcanized Rubber Composition 11.

(2) Unvulcanized Rubber Composition obtained in (1) above was subjected to extrusion processing to a shape of a tire tread and molding with other members on a tire molding machine, thus forming an unvulcanized tire. This unvulcanized tire was subjected to 20-minute press-vulcanization at 170° C. in a vulcanizer to obtain a tire. Then, by introducing air in the tire, Pneumatic Tire 11 was obtained.

Preparation Examples 12-2 to 20-2

The respective starting compounds were subjected to processing in the same manner as in Preparation Example 11-2 in accordance with the formulation shown in Table 4 to obtain the respective Unvulcanized Rubber Compositions 12 to 20 and Pneumatic Tires 12 to 20.

3. Results
<Copolymer>

With respect to the obtained Copolymers 11 to 20, weight-average molecular weight Mw, number-average molecular weight Mn, glass transition temperature Tg, Mooney viscosity and copolymerization ratio (1) were measured by the following methods. The results are shown in Table 3.

(Measurement of Weight-Average Molecular Weight Mw, Number-Average Molecular Weight Mn)

Mw and Mn were measured with an apparatus GPC-8000 Series available from TOSO CORPORATION and a differential refractometer as a detector, and were converted based on standard polystyrene.

(Measurement of Glass Transition Temperature (Tg))

With respect to each copolymer, measurement was carried out using a differential scanning calorimeter (DSC) at a heat-up rate of 10° C./min from an initial temperature of −150° C. to a final temperature of 150° C. to calculate Tg.

(Processability)

With respect to each copolymer, a Mooney viscosity $ML_{1+4}$ (130° C.) thereof was measured using a Mooney viscosity tester in accordance with JIS K 6300 "Test Method of Unvulcanized Rubber". After pre-heating to 130° C. for one minute, under this temperature condition, a large rotor was rotated and after a lapse of four minutes, the Mooney viscosity $ML_{1+4}$ (130° C.) was measured. It is indicated that the smaller the Mooney viscosity is, the better the processability is.

(Copolymerization Ratio (1) of Branched Conjugated Diene Compound (1))

The copolymerization ratio (1) (% by weight) was measured by a usual method using a pyrolysis gas chromatography (PGC). Namely, a calibration curve of a purified branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

TABLE 3

| | Preparation Example | | | | | | | | | |
|---|---|---|---|---|---|---|---|---|---|---|
| | 11-1 | 12-1 | 13-1 | 14-1 | 15-1 | 16-1 | 17-1 | 18-1 | 19-1 | 20-1 |
| | | | | | Copolymer | | | | | |
| | 11 | 12 | 13 | 14 | 15 | 16 | 17 | 18 | 19 | 20 |
| (% by weight) | | | | | | | | | | |
| Farnesene | 0 | 0 | 0 | 0 | 55 | 55 | 20 | 20 | 20 | 20 |
| Butadiene | 55 | 55 | 0 | 0 | 0 | 0 | 35 | 35 | 0 | 0 |

TABLE 3-continued

| | Preparation Example | | | | | | | | | |
|---|---|---|---|---|---|---|---|---|---|---|
| | 11-1 | 12-1 | 13-1 | 14-1 | 15-1 | 16-1 | 17-1 | 18-1 | 19-1 | 20-1 |
| | Copolymer | | | | | | | | | |
| | 11 | 12 | 13 | 14 | 15 | 16 | 17 | 18 | 19 | 20 |
| Isoprene | 0 | 0 | 55 | 55 | 0 | 0 | 0 | 0 | 35 | 35 |
| Styrene | 45 | 45 | 45 | 45 | 45 | 45 | 45 | 45 | 45 | 45 |
| Hydrogenation ratio (%) | 0 | 50 | 0 | 50 | 0 | 50 | 0 | 50 | 0 | 50 |
| Mw | 5000 | 5000 | 5113 | 4900 | 5420 | 5332 | 5221 | 5224 | 5212 | 5201 |
| Mn | 4800 | 4900 | 4789 | 4800 | 5210 | 5320 | 5198 | 5187 | 4742 | 4753 |
| Mw/Mn | 1.0 | 1.1 | 1.1 | 1.0 | 1.0 | 1.0 | 1.0 | 1.0 | 1.1 | 1.1 |
| Tg (° C.) | −13.4 | −14.0 | −5.1 | −6.0 | −21.2 | −18.8 | −15.2 | −14.2 | −12.1 | −11.8 |
| Mooney viscosity $ML_{1+4}$ (130° C.) | 43 | 47 | 52 | 59 | 17 | 21 | 23 | 25 | 24 | 26 |
| Copolymerization ratio (l) (% by weight) | — | — | — | — | 55.0 | 55.0 | 20.0 | 20.0 | 20.0 | 20.0 |

<Rubber Compositions and Tires>

The following tests were carried out using Unvulcanized Rubber Compositions 11 to 20 and Pneumatic Tires 11 to 20 obtained above. The results are shown in Table 4.

(Processability)

Test pieces of a given size were prepared from each of the above unvulcanized rubber compositions, and a Mooney viscosity $ML_{1+4}$ (130° C.) thereof was measured using a Mooney viscosity tester in accordance with JIS K 6300 "Test Method of Unvulcanized Rubber". The test piece was pre-heated to 130° C. for one minute and under this temperature condition, a large rotor was rotated and after a lapse of four minutes, the Mooney viscosity $ML_{1+4}$ (130° C.) was measured. It is indicated that the smaller the Mooney viscosity is, the better the processability is.

(Grip Performance)

In-vehicle running was carried out on a test course of an asphalt road surface using each pneumatic tire obtained above. A test driver evaluated stability control at steering in ten levels. It is indicated that the larger the value is, the more superior the grip performance is.

(Abrasion Resistance)

Test running was carried out 20 rounds of a test course using each pneumatic tire. A depth of a groove of the tire before and after the running was measured, and assuming that the abrasion resistance index of Pneumatic Tire 11 is 100, the depth of a groove of each pneumatic tire is represented by an index. It is indicated that the larger the value is, the higher and the more superior the abrasion resistance is.

(Bleed Resistance)

A surface of each pneumatic tire was observed and a degree of bleeding of an oily substance was evaluated with naked eyes.

○: No bleeding
Δ: Slightly bleeding
X: Vigorously bleeding

TABLE 4

| | Preparation Example | | | | | | | | | |
|---|---|---|---|---|---|---|---|---|---|---|
| | 11-2 | 12-2 | 13-2 | 14-2 | 15-2 | 16-2 | 17-2 | 18-2 | 19-2 | 20-2 |
| Blending amount (part by weight) | | | | | | | | | | |
| SBR | 150 | 150 | 150 | 150 | 150 | 150 | 150 | 150 | 150 | 150 |
| Copolymer 11 | 50 | | | | | | | | | |
| Copolymer 12 | | 50 | | | | | | | | |
| Copolymer 13 | | | 50 | | | | | | | |
| Copolymer 14 | | | | 50 | | | | | | |
| Copolymer 15 | | | | | 50 | | | | | |
| Copolymer 16 | | | | | | 50 | | | | |
| Copolymer 17 | | | | | | | 50 | | | |
| Copolymer 18 | | | | | | | | 50 | | |
| Copolymer 19 | | | | | | | | | 50 | |
| Copolymer 20 | | | | | | | | | | 50 |
| Carbon black | 100 | 100 | 100 | 100 | 100 | 100 | 100 | 100 | 100 | 100 |
| Antioxidant | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 |
| Sulfur | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 |
| Results of evaluation | | | | | | | | | | |
| Mooney viscosity $ML_{1+10}$ (130° C.) | 49.7 | 49.6 | 55.2 | 56.2 | 42.0 | 38.2 | 45.2 | 47.5 | 49.6 | 50.1 |
| Grip performance | 5 | 6 | 6 | 7 | 8 | 9 | 7 | 8 | 8 | 8 |
| Abrasion resistance | 100 | 109 | 101 | 110 | 112 | 134 | 112 | 120 | 117 | 128 |
| Bleed resistance | ○ | ○ | ○ | ○ | ○ | ○ | ○ | ○ | ○ | ○ |

As shown in Table 4, in any of Preparation Examples 15 to 20 in which the farnesene copolymer was blended, the Mooney viscosity is low and processability is improved compared with polymers in which the farnesene copolymer was replaced with butadiene or isoprene being the conjugated diene compound. As shown, especially in Preparation Examples 16, 18 and 20 in which the hydrogenated farnesene copolymer was blended, processability is good, and also grip performance, abrasion resistance and bleed resistance are good.

INDUSTRIAL APPLICABILITY

The present invention can provide a novel branched conjugated copolymer or hydrogenated branched conjugated copolymer being useful for improving processability as a rubber component for a tire, and by using these copolymers, can provide a rubber composition for a tire enhancing both of abrasion resistance and grip performance to a high level and exhibiting excellent processability. Further, in the case of using the hydrogenated branched conjugated copolymer, the rubber composition for a tire inhibiting generation of bleeding can be provided.

The invention claimed is:

1. A pneumatic tire produced by processing a rubber composition comprising a copolymer of a hydrogenated branched conjugated diene copolymer in a liquid form, a rubber component consisting of a styrene-butadiene rubber, and a carbon black,
wherein the hydrogenated branched conjugated diene copolymer is produced by copolymerizing a branched conjugated diene compound and a vinyl compound to form a branched conjugated diene copolymer and hydrogenating the branched conjugated diene copolymer, a copolymerization ratio of the branched conjugated diene compound is 1 to 99% by weight, a copolymerization ratio of the vinyl compound is 99 to 1% by weight, the branched conjugated diene compound is myrcene and farnesene, the vinyl compound is styrene, and the rubber composition includes 20 to 100 parts by weight of the hydrogenated branched conjugated diene copolymer and 1 part by weight or more of the carbon black based on 100 parts by weight of the rubber component consisting of the styrene-butadiene rubber.

2. The pneumatic tire of claim 1, wherein a Mooney viscosity $ML_{1+4}$ (130° C.) of the rubber composition to which the hydrogenated branched conjugated diene copolymer is blended is lower compared with a Mooney viscosity $ML_{1+4}$ (130° C.) of a rubber composition comprising a polymer having the same weight-average molecular weight as the branched conjugated diene copolymer and prepared by replacing the branched conjugated diene compound by at least one of 1,3-butadiene and isoprene.

3. The pneumatic tire of claim 1, wherein the hydrogenated branched conjugated diene copolymer has a weight-average molecular weight of 2,000 to 200,000.

4. The pneumatic tire of claim 1, wherein the hydrogenated branched conjugated diene copolymer has a hydrogenation ratio of 10 to 90%.

5. The pneumatic tire of claim 1, wherein the copolymerization ratio of the vinyl compound is 40% by weight or more.

6. The pneumatic tire of claim 4, wherein the copolymerization ratio of the vinyl compound is 40% by weight or more.

7. The pneumatic tire of claim 3, wherein the hydrogenated branched conjugated diene copolymer has a hydrogenation ratio of 10 to 90%.

8. The pneumatic tire of claim 1, wherein the processing comprises forming a tread comprising the rubber composition and vulcanizing an unvulcanized tire comprising the tread.

9. The pneumatic tire of claim 3, wherein the copolymerization ratio of the vinyl compound is 40% by weight or more.

10. The pneumatic tire of claim 1, wherein the rubber composition includes 30 to 70 parts by weight of the hydrogenated branched conjugated diene copolymer based on 100 parts by weight of the rubber component consisting of the styrene-butadiene rubber.

11. The pneumatic tire of claim 1, wherein the hydrogenated branched conjugated diene copolymer has a weight-average molecular weight of 3,000 to 100,000.

12. The pneumatic tire of claim 1, wherein the hydrogenated branched conjugated diene copolymer has a hydrogenation ratio of 30 to 70%.

13. The pneumatic tire of claim 3, wherein the processing comprises forming a tread comprising the rubber composition and vulcanizing an unvulcanized tire comprising the tread.

14. The pneumatic tire of claim 1, wherein the hydrogenated branched conjugated diene copolymer has a glass transition temperature of −80° C. to 110° C.

15. The pneumatic tire of claim 1, wherein the hydrogenated branched conjugated diene copolymer is produced by copolymerizing a conjugated diene compound, the branched conjugated diene compound and the vinyl compound to form the branched conjugated diene copolymer and hydrogenating the branched conjugated diene copolymer, the conjugated diene compound is at least one of 1,3-butadiene and isoprene, a copolymerization ratio of the conjugated diene compound is greater than 0% by weight and less than 99% by weight, and the copolymerization ratio of the vinyl compound is less than 99% by weight.

16. The pneumatic tire of claim 1, wherein the hydrogenated branched conjugated diene copolymer is produced by copolymerizing a conjugated diene compound, the branched conjugated diene compound and the vinyl compound to form the branched conjugated diene copolymer and hydrogenating the branched conjugated diene copolymer, the conjugated diene compound is at least one of 1,3-butadiene, isoprene, and 2,3-dimethyl-1,3-butadiene, a copolymerization ratio of the conjugated diene compound is greater than 0% by weight and less than 99% by weight, and the copolymerization ratio of the vinyl compound is less than 99% by weight.

17. The pneumatic tire of claim 3, wherein the rubber composition includes 30 to 70 parts by weight of the hydrogenated branched conjugated diene copolymer based on 100 parts by weight of the rubber component consisting of the styrene-butadiene rubber.

18. The pneumatic tire of claim 3, wherein the hydrogenated branched conjugated diene copolymer has a hydrogenation ratio of 30 to 70%.

19. The pneumatic tire of claim 3; wherein the hydrogenated branched conjugated diene copolymer has a glass transition temperature of −80° C. to 110° C.

20. The pneumatic tire of claim 4, wherein the processing comprises forming a tread comprising the rubber composition and vulcanizing an unvulcanized tire comprising the tread.

21. The pneumatic tire of claim 4, wherein the rubber composition includes 30 to 70 parts by weight of the hydrogenated branched conjugated diene copolymer based on 100 parts by weight of the rubber component consisting of the styrene-butadiene rubber.

\* \* \* \* \*